May 5, 1970

W. J. LUTHI 3,510,772

METHOD AND APPARATUS FOR STATISTICALLY MEASURING
ELECTRICAL POWER CONSUMPTION

Filed Nov. 8, 1968

INVENTOR.
WERNER JOSE LUTHI
BY
Morgan Finnegan Durham & Pine

United States Patent Office 3,510,772
Patented May 5, 1970

3,510,772
METHOD AND APPARATUS FOR STATISTI-CALLY MEASURING ELECTRICAL POWER CONSUMPTION
Werner Jose Luthi, Cham, Zug, Switzerland, assignor to Landis & Gyr, Zug, Switzerland, a corporation of Switzerland
Filed Nov. 8, 1968, Ser. No. 774,258
Claims priority, application Switzerland, Nov. 13, 1967, 15,827/67
Int. Cl. G01r 21/00
U.S. Cl. 324—142                26 Claims

ABSTRACT OF THE DISCLOSURE

A method and circuitry for statistically measuring electrical power consumption for the parameters of voltage and current whereby the voltage is converted to a first train of pulses wherein the product of frequency and pulse width is proportional to the voltage, the current is converted to a second train of pulses wherein the product of frequency and pulse width is proportional to the current, a third train of scanning pulses is generated wherein the frequency is constant and the width of the pulses is much smaller than the width of the pulses in the first and second pulse trains, all three pulse trains are inputs to a coincidence circuit the output of which is a fourth train of pulses, the average frequency of which is a measure of the power, and the output of the coincidence circuit is counted to measure the power consumed.

---

The present invention relates to a method and circuitry for measuring electrical active energy by forming the product of voltage and current by means of a statistical coincidence method. A train of pulses related to the voltage is fed to one input of a coincidence circuit and a second train of pulses related to the current is fed to a second input of the same coincidence circuit. A third train of pulses independent of either voltage or current is fed to a third input of the same coincidence circuit. At the output of this coincidence circuit are pulses statistically distributed in time.

Before proceeding further it is instructive to define two very common terms, viz. power and energy. Power is energy per unit time. Concomitantly, energy is the product of power and time. For example, if a pulse train existed in which the frequency of the pulses was directly related to power, then counting these pulses over a specified period of time would yield a measure of the energy content over that same period of time.

A known method exists for forming the product of voltage and current employing statistical coincidence. According to this method a train of rectangular pulses is formed with the pulse width proportional to the voltage. A second train of rectangular pulses is formed wherein the pulse width is proportional to the current. These two pulse trains are then compared in an electronic coincidence circuit. At the output of the coincidence circuit a train of pulses, appears having an average voltage which is proportional to the power.

In order to determine the energy a further train of pulses must be formed having a frequency proportional to this average voltage which, in turn, is proportional to power. This is necessary in order to measure the power over a specified period of time and, hence, the energy content for that period of time. The conversion of the average voltage to a pulse train can be accomplished through the use of a voltage to frequency converter, for example, a voltage controlled oscillator followed by a pulse forming circuit. This additional step of translating average voltage into a pulse train whose frequency is related to the average voltage introduces additional measurement errors. Furthermore, this known method is quite costly.

A further disadvantage of the known method is that accurate voltage to frequency converters have a relatively high output frequency. This necessitates employing a pulse counter for counting the pulses from the voltage to frequency converter, having a large storage capacity.

The disadvantages of the known method are eliminated in accordance with this invention. A first train of pulses is produced wherein the product of pulse frequency and pulse width is proportional to the voltage, a second train of pulses is produced wherein the product of pulse frequency and pulse width is proportional to the current, and a third train of pulses is produced having a constant frequency and very narrow pulse width as compared to the width of the pulses in the first and second pulse trains. These pulse trains are compared for coincidence and the result of that comparison is continuously counted to measure the active energy.

A circuit for carrying out this technique is characterized in accordance with the invention by a voltage pulse converter which produces a train of pulses having the characteristic that the product of pulse width and pulse frequency is proportional to the voltage, a current pulse converter which produces a train of pulses having the characteristic that the product of pulse width and pulse frequency is proportional to the current, a pulse generator which produces a train of pulses of constant frequency and having a very narrow pulse width as compared with the width of the pulses produced by the voltage pulse converter and the current pulse converter, a coincidence circuit having at least three inputs, one input being connected to the output of the voltage pulse converter, a second input being connected to the output of the current pulse converter, and a third input being connected to the output of the pulse generator, and a pulse counter connected to the output of the coincidence circuit.

Several illustrative embodiments of the invention are described in more detail in the following specification. The specification includes the drawings wherein.

Figure 1:
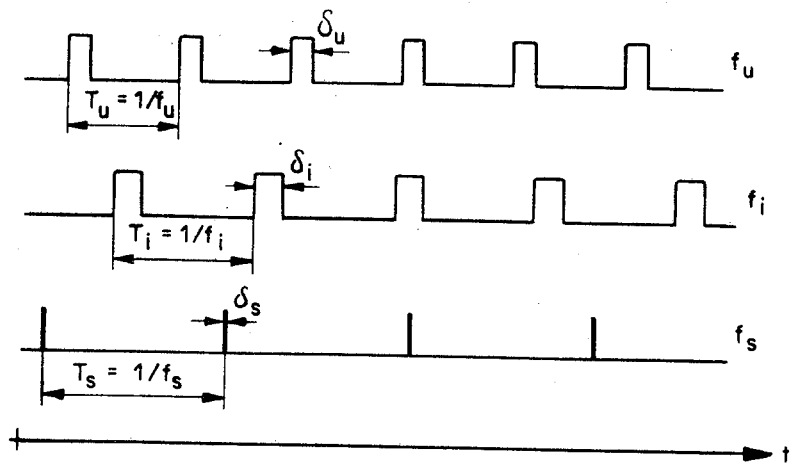
FIG. 1 is a pulse diagram.

In FIG. 1 a first train of pulses with a frequency $f_u$, a period $T_u$ and a pulse width $\delta_u$ is shown. A second train of pulses is shown with a frequency $f_i$, a period $T_i$ and a pulse width $\delta_i$. Furthermore, the diagram of FIG. 1 shows a train of scanning pulses with a frequency $f_s$, a period $T_s$ and a pulse width $\delta_s$. There exists the relationships $$\delta_s \ll \delta_u \text{ and } \delta_s \ll \delta_i$$

For the first general considerations, assume that the pulse width $\delta_s$ is infinitely small. Furthermore, assume that the ratios of frequencies of $f_u$, $f_i$ and $f_s$ to each other are irrational numbers.

The probability $p_u$ that a scanning pulse coincides in time with a pulse of the first pulse train is, in accordance with the definition of probability $$p_u = \frac{\delta_u}{T_u} = \delta_u \cdot f_u$$

The probability $p_i$ that a scanning pulse will coincide in time with a pulse of the second pulse train is $$p_i = \frac{\delta_i}{T_i} = \delta_i \cdot f_i$$

The probability $p$ that a scanning pulse will coincide in time with a pulse of the first train of pulses and with a pulse of the second train of pulses is $$p = p_u \cdot p_i = \delta_u \cdot f_u \cdot \delta_i \cdot f_i$$

Figure 2:
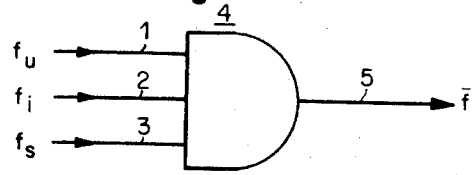
FIG. 2 is an AND gate shown symbolically.

In FIG. 2, the first train of pulses is fed to input 1, the second train of pulses to input 2 and the train of scanning pulses to input 3 of AND gate 4. At output 5 of AND gate 4, a pulses appears when and only when a pulse is present simultaneously at all three inputs.

The average frequency $\bar{f}$ of the pulses distributed statistically in time which occur at the output 5 of AND gate 4 is proportional to the probability $p$ of coincidence and the scanning frequency $f_s$:

$$\bar{f} = p \cdot f_s = \delta_u \cdot f_u \cdot \delta_i \cdot f_i \cdot f_s$$

When the product of pulse frequency $f_u$ and pulse width $\delta_u$ of the first train of pulses is proportional to voltage U and the product of pulse frequency $f_i$ and pulse width $\delta_i$ of the second train of pulses is proportional to current I, then, assuming voltage and current to be constant, the following relationship exists:

$$\delta_u \cdot f_u = k_1 \cdot U$$
$$\delta_i \cdot f_i = k_2 \cdot I$$

and $$\bar{f} = k_1 \cdot k_2 \cdot f_s \cdot U \cdot I$$

The average output frequency $\bar{f}$ is therefore proportional to the power $(U \cdot I)$. By continuous counting of the output pulses, i.e. by integration of the power with respect to time, the amount of the energy can be determined. The result, according to Bernoulli's theorem, is more accurate the longer the measurement lasts.

Up to now it has been assumed that voltage and current are constant. Theoretical and experimental investigations have shown that the measurement method described can be used without limitation even when voltage and current vary with time. In particular the proposed method can be used for measuring the active energy of alternating current and voltage when the statistically distributed pulses are counted backwards where there is a negative instantaneous value of the product of current and voltage.

If U is the effective value of the voltage, I the effecting value of the current, $\varphi$ the phase angle between voltage and current and $t$ the time, then one obtains as a result of the integration the active energy.

$$W = U \cdot I \cdot \cos \varphi \cdot t$$

A further development of the inventive concept exists where the frequency $f_u$ of the first train of pulses and the frequency $f_i$ of the second train of pulses are constant. Under these circumstances:

$$\delta_u = k_3 \cdot U$$
$$\delta_i = k_4 \cdot I$$

and $$\bar{f} = k_3 \cdot k_4 \cdot f_u \cdot f_s \cdot U \cdot I$$

Furthermore, it is possible to maintain the pulse width $\delta_u$ of the first train of pulses and the pulse width $\delta_i$ of the second train of pulses constant. Under these conditions:

$$f = k_5 \cdot U$$
$$f = k_6 \cdot I$$

and $$\bar{f} = k_5 \cdot k_6 \cdot f_u \cdot f_i \cdot f_s \cdot U \cdot I$$

In the following, it will be explained by way of example based on the last mentioned case how the inventive concept can be applied in practice.

Figure 3:
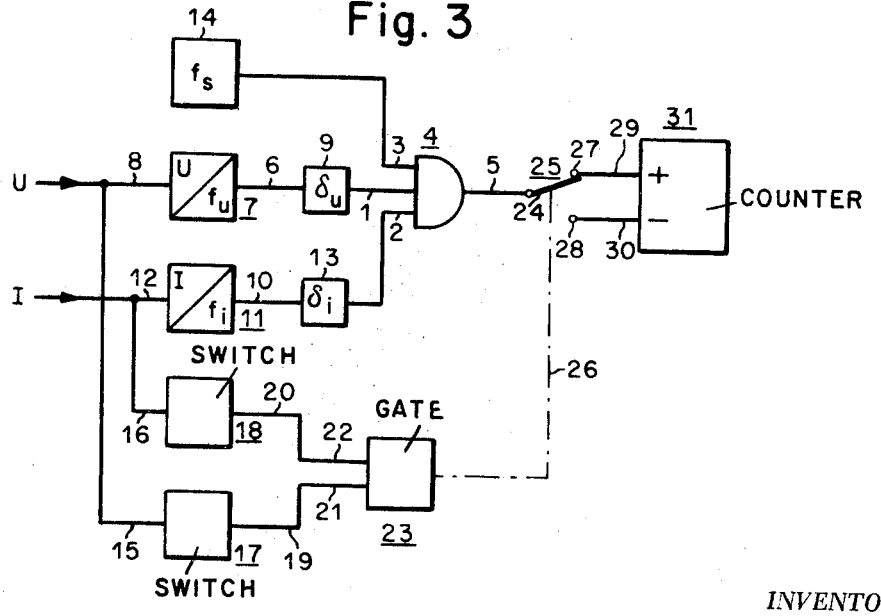
FIG. 3 is a block diagram of a single-phase energy meter.

In FIG. 3 the AND gate in FIG. 2 is provided with the same reference numbers. The output 6 of a voltage to frequency converter 7 at the input 8 of which the voltage U is applied is connected via a pulse forming circuit, which could be a monostable multivibrator, to input 1 of AND gate 4. The output 10 of a current to frequency converter 11 to whose input 12 the current I is fed is connected via a pulse forming circuit 13, which could be a monostable multivibrator, to input 2 of AND gate 4. Input 3 of AND gate 4 is connected to pulse generator 14. The voltage U and the current I are connected to inputs 15 and 16 respectively of switches 17 and 18 respectively whose outputs 19 and 20 respectively are connected with inputs 21 and 22 respectively of gate 23. Gate 23 is in logical state "1" when both inputs 21 and 22 show the same logical state. Output 5 of AND gate 4 is connected to contact arm 24 of switch 25 from which an active connection 26 leads to gate 23. Switch 25 whose function is shown symbolically can of course be replaced by electronic switch elements performing the same function. Contact 27 of switch 25 is connected to the forward counting input 29 and contact 28 is connected to the backwards counting input 30 of pulse counter 31.

At input 1 of AND gate 4 there appears a train of pulses whose frequency $f_u$ is proportional to voltage U and whose pulse width $\delta_u$ is constant. The frequency $f_i$ of the train of pulses with constant pulse width $\delta_i$ which appears at input 2 of AND gate 4 is proportional to the current I. Pulse generator 14 produces scanning pulses of constant frequency $f_s$ having a very small pulse width $\delta_s$. The average value of the frequency $\bar{f}$ of the statistically distributed pulses occuring at output 5 of AND gate 4 is proportional to the instantaneous value of the power.

Output 19 of switch 17 is in logical state "1" when the instantaneous value of its input variable is positive and in logical state "0" when its input variable is negative. The same is true of output 20 of switch 18. Gate 23 actuates switch 25 in such a manner that it is in the position of positive counting direction when both inputs 21 and 22 of gate 23 have the same logical state. Thus the output pulses of AND gate 4 are added in pulse counter 31 when the instantaneous value of the product of current and voltage is positive. With a negative instantaneous value of the product of voltage and current, the output pulses of AND gate 4 are subtracted so that the active energy can be determined from the instantaneous state of pulse counter 31.

Figure 4:
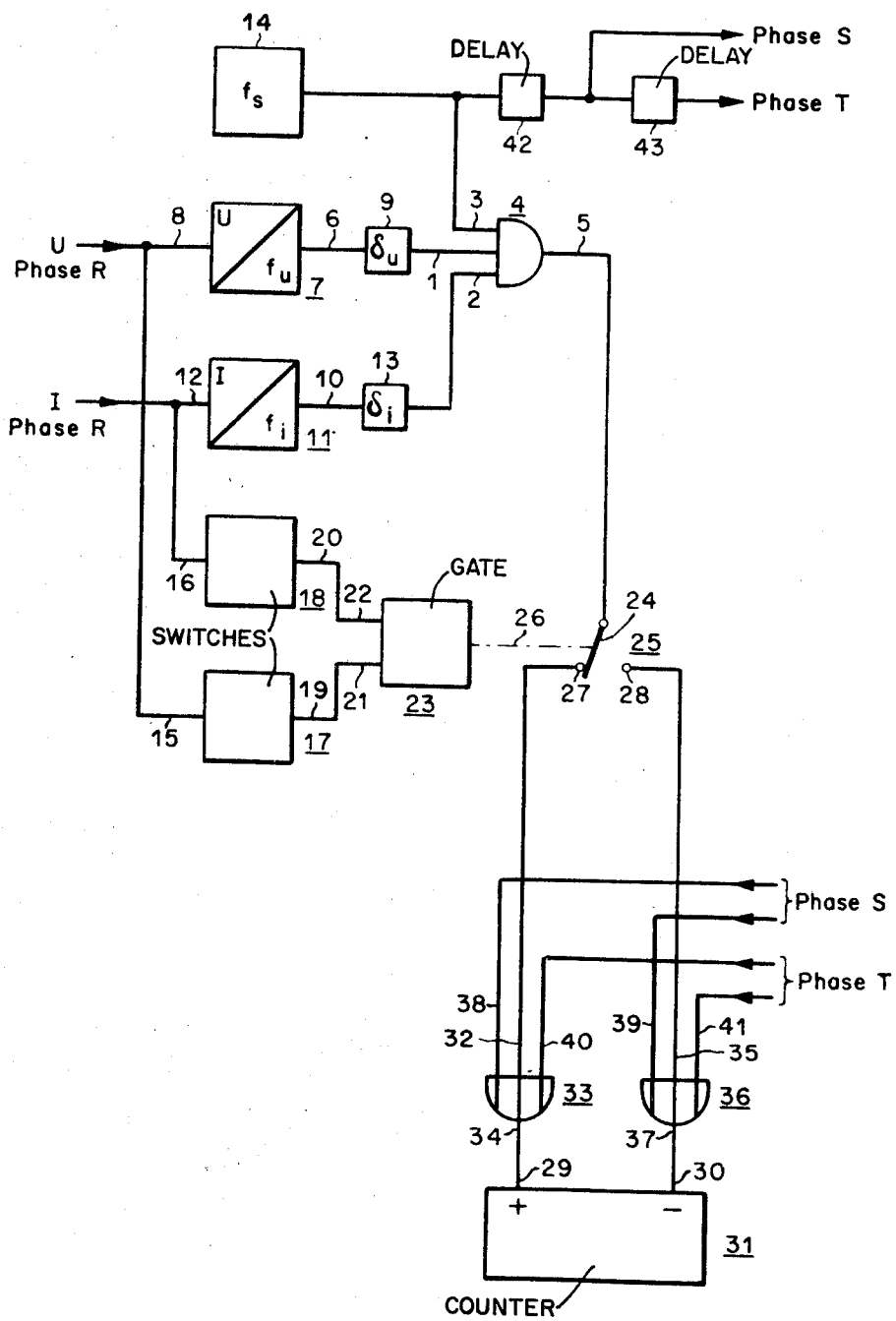
FIG. 4 is a block diagram of a three-phase energy meter.

In a multiphase network the power of each phase can be converted separately into a proportional frequency and the pulses subsequently counted. FIG. 4 shows that it is possible to use for this purpose a single pulse counter where the scanning pulses for all phases are produced by the same pulse generator and shifted in time with respect to each other in such a manner that no simultaneous scanning of two or more phases can take place.

The parts 1 to 26 of FIG. 4, which are associated with phase R, are the same as those of FIG. 3. Contact 27 of switch 25 is connected to the forward counting input 29 of pulse counted 31, which is common to all phases. Contact 28 of switch 25 is connected to the backwards counting input 30 of pulse counter 31. Input 38 of OR gate 33 and input 39 of OR gate 36 are connecter to a switch not shown in the drawing which is associated with phase S and corresponds to switch 25 of phase R. A switch (not shown in FIG. 4), associated with phase T is connected to input 40 of OR gate 33 and with input 41 of OR 36. Pulse generator 14 is used for all phases and is connected via delay device 42 which could be a lumped constant delay line, to an input of an AND gate (not shown) associated with phase S which corresponds to AND gate 4 of phase R and, via another delay device 43, to an input of an AND gate associated with phase T.

The scanning pulses proceeding from pulse generator 14 pass undelayed to input 3 of AND gate 4 of phase R. The scanning pulses for the AND gate of phase S are delayed in delay device 42 by the time $\tfrac{1}{3}T_s$. The shifting of the scanning pulses by the time $\tfrac{2}{3}T_s$ for the AND gate of phase T takes place in the delay members 42 and 43. The pulses which are distributed statistically in time which are produced at an AND gate associated with each phase pass, in the case of a positive product of voltage and current to one of the inputs of OR gate 33. The pulses pass to OR gate 36 in the case of a negative product of voltage and current. Thus the statistically distributed pulses associated with all three phases are counted by pulse counter 31, the instantaneous state of which corresponds to the amount of active energy.

For the consideration of the occurrence of the statistically distributed pulses it was assumed that the frequencies $f_u$, $f_i$ and $f_s$ and their average values are in an irrational ratio to each other. If the frequency $f_i$ is proportional to the instantaneous value of the current which changes continuously with variations in load, it is not always possible to maintain this assumption. Since, however, an instantaneous accidental dependence between the frequency $f_i$ and the scanning frequency $f_s$ immediately disappears this requirement is by no means necessary.

The voltage, on the other hand, has a more or less stable average value. Its corresponding average frequency should therefore not be a harmonic or subharmonic of the scanning frequency $f_s$.

In practice good independence between the frequencies $f_u$ and $f_s$ and $f_i$ and $f_s$ respectively can be attained since both the voltage and the current are subject to continuous small variations.

Under purely ohmic loading of a rigid voltage source with a real internal resistance there is an unequivocal correlation between the frequencies $f_u$ and $f_i$. Since, however, statistical variations of the phase between voltage and current are produced in a power distributing system by the connecting and disconnecting of storage means of the most varied type and composition, an instantaneous dependence is immediately done away with again.

The independence between the frequencies $f_u$ and $f_i$ can be additionally assured by modulating one of the two statistically.

I claim:

1. A method of measuring electrical active energy produced by the parameters of current and voltage comprising the steps of
   providing a first train of pulses wherein the product of pulse frequency and pulse width is proportional to said voltage;
   providing a second train of pulses wherein the product of pulse frequency and pulse width is proportional to said current;
   providing a third train of pulses of constant frequency, the width of the pulses in said third train of pulses being constant and small as compared to the width of the pulses in said first and second trains of pulses;
   comparing said first, second and third trainst of pulses for coincidence to produce a train of coincidence pulses having an average value proportional to power; and
   counting the pulses appearing in said train of coincidence pulses to obtain a measure of energy.

2. A method according to claim 1 wherein the width of the pulses in said first and second trains of pulses is constant.

3. A method according to claim 1 wherein the frequency of the pulses in said first and second trains of pulses is constant.

4. A method according to claim 1 wherein the pulses appearing in said train of coincidence pulses are counted in one direction when the product of current and voltage is positive and counted in a different direction when said product is negative.

5. A method according to claim 1 wherein the ratio of the frequency of the pulses in said third train of pulses to the average value of the frequency of the pulses in said first train of pulses is an irrational number, and
   the ratio of the frequency of the pulses in said third train of pulses to the average value of the frequency of the pulses in said second train of pulses in an irrational number.

6. A method according to claim 1 wherein the frequency of one of said pulse trains, said frequency being proportional to one of said parameters, is statistically modulated.

7. Apparatus for measuring electrical active energy produced by the parameters of current and voltage, comprising,
   a first pulse converter for producing a first train of pulses having the characteristic that the product of pulse frequency and pulse width is proportional to the amplitude of a voltage applied thereto;
   a second pulse converter for producing a second train of pulses having the characteristic that the product of pulse frequency and pulse width is proportional to the magnitude of a current applied thereto;
   a pulse generator for producing a third of pulses of constant frequency, the width of the pulses in said train of pulses being constant and small as compared to the width of the pulses in said first and second train of pulses;
   a coincidence circuit operably connected to said first and second pulse converters and said pulse generator to provide an output pulse upon the simultaneous occurrence of a pulse in said first, second third pulse trains; and
   a pulse counter operably connected to said coincidence circuit to count said output pulses.

8. Apparatus according to claim 7 wherein said coincidence circuit is an AND gate.

9. Apparatus according to claim 7 wherein said first pulse converter produces a first train of pulses having the characteristic that
   the pulse frequency is proportional to voltage, and
   the pulse is constant, and
   said second pulse converter produces a second train of pulses having the characteristic that
   the pulse frquency is proportional to current, and
   the pulse width is constant.

10. Apparatus according to claim 9 wherein said first pulse converter comprises a monostable multivibrator for producing said first train of pulses of constant width, and
    said second pulse converter comprises a monostable multivibrator for producing said second train of pulses of constant width.

11. Apparatus according to claim 7 wherein said first pulse converter produces a first train of pulses having the characteristic that
    the pulse width is proportional to voltage, and
    the pulse frequency is constant, and
    said second pulse converter produces a second train of pulses having the characteristic that
    the pulse width is proportional to current, and
    the pulse frequency is constant.

12. Apparatus for measuring electrical active energy produced by the parameters of current and voltage, comprising,
    a first pulse converter for producing a first train of pulses having the characteristic that the product of pulse frequency and pulse width is proportional to the amplitude of a voltage applied thereto;
    a second pulse converter for producing a second train of pulses having the characteristic that the product of pulse frequency and pulse width is proportional to the magnitude of a current applied thereto;
    a pulse generator for producing a third train of pulses of constant frequency, the width of the pulses in said third train of pulses being constant and small as compared to the width of the pulses in said first and second trains of pulses;
    a coincidence circuit operably connected to said first and second pulse converters and said pulse generator to provide an output pulse upon the simultaneous occurrence of a pulse in said first, second and third pulse trains; and a reversible pulse counter operably connected to said coincidence circuit to count said output pulses; and circuit means for controlling the direction of counting of said reversible counter so that said counter counts in one direction when the product of said parameters is positive and said counter counts in a different direction when the product of said parameters is negative.

13. Apparatus according to claim 12 wherein said circuit means includes a pair of switching devices each responsive to a different one of said parameters and being operable to assume a state corresponding to the polarity of the respective parameter applied thereto, and a coincidence circuit means coupled between said switching devices and said reversible pulse counter to cause said counter to count in one direction when said switching devices are in the same state and in the opposite direction when said switching devices are in different states.

14. A method for measuring electrical active energy in a multi-phase network, said energy being produced by the parameters of current and voltage associated with each of said phases comprising the steps of, providing a first train of pulses for each of said phases wherein the product of pulse frequency and pulse width is proportional to the respective voltage of each of said phases;

providing a second train of pulses for each of said phases wherein the product of pulse frequency and pulse width is proportional to the respective current of each of said phases;

providing a third train of pulses of constant frequency, the width of the pulses in said third train of pulses being constant and small as compared to the width of the pulses in each said first and second trains of pulses associated with each of said phases; comparing said first and second trains of pulses associated with each of said phases with said third train of pulses to produce output pulses upon coincidence to thereby provide a train of output pulses for each of said phases having an average frequency proportional to power; and counting said output pulses in said trains of output pulses to provide a measure of electrical active energy in the multi-phase network.

15. A method according to claim 14 wherein the width of the pulses in each of said first and second trains of pulses associated with each of said phases is constant.

16. A method according to claim 14 wherein the frequency of the pulses in each of said first and second trains of pulses associated with each of said phases is constant.

17. A method according to claim 14 wherein said output pulses appearing in each of said trains of output pulses associated with each of said phases are counted in one direction when the product of voltage and current in the respective phase is positive, and counted in a different direction when the respective product of voltage and current is negative.

18. A method according to claim 14 wherein the ratio of the frequency of the pulses in said third train of pulses to the average value of the frequency of the pulses in each said first trains of pulses is an irrational number, and the ratio of the frequency of the pulses in said third train of pulses to the average value of the frequency of the pulses in each said second trains of pulses is an irrational number.

19. A method according to claim 14 wherein the frequency of one of said trains of pulses associated with each of said phases, is statistically modulated.

20. Apparatus for measuring electrical active energy in a multi-phase network, said energy produced by the parameters of current and voltage associated with each of said phases, comprising, a first pulse converter associated with each of said phases for producing a first train of pulses having the characteristic that the product of pulse frequency and pulse width is proportional to the respective voltage of each of said phases;

a second pulse converter associated with each of said phases for producing a second train of pulses having the characteristic that the product of pulse frequency and pulse width is proportional to the respective current of each of said phases;

circuit means for providing a separate train of scanning pulses for each of said phases, each of said scanning pulses having the same width and being very narrow compared to the width of pulses in said first and second trains of pulses, said scanning pulses being non coincident with scanning pulses in others of said separate trains of scanning pulses;

a coincidence circuit associated with each of said phases and operably connected to said first and second pulse converters and said circuit means for providing scanning pulses to produce output pulses upon coincidence to thereby provide a train of output pulses for each of said phases having average frequency proportional to power; and a pulse counter operably connected to the output of each of said coincidence circuits to count pulses produced thereby.

21. Apparatus according to claim 20 wherein said circuit means comprises, a pulse generator for producing one of said separate trains of scanning pulses, and delay line means coupled to said pulse generator for producing the others of said separate trains of scanning pulses delayed in time.

22. Apparatus for measuring electrical active energy in a multi-phase network, said energy produced by the parameters of current and voltage associated with each of said phases, comprising, a first pulse converter associated with each of said phases for producing a first train of pulses having the characteristic that the product of pulse frequency and pulse width is proportional to the respective voltage of each of said phases;

a second pulse converter associated with each of said phases for producing a second train of pulses having the characteristic that the product of pulse frequency and pulse width is proportional to the respective current of each of said phases;

circuit means for providing a separate train of scanning pulses for each of said phases, each of said scanning pulses having the same width and being very narrow compared to the width of pulses in said first and second trains of pulses, said scanning pulses being non coincident with scanning pulses in others of said separate trains of scanning pulses;

a coincidence circuit associated with each of said phases and operably connected to said first and second pulse converters and said circuit means for providing scanning pulses to produce output pulses upon coincidence to thereby provide a train of output pulses for each of said phases having average frequency proportional to power; and a reversible pulse counter operably connected to each of said coincidence circuits to count said output pulses; and switching circuit means for controlling the direction of counting of said reversible counter so that said counter counts in one direction when the product of said parameters is positive and said counter counts in a different direction when the product of said parameters is negative.

23. Apparatus according to claim 22 wherein said switching circuit means includes
- a pair of switching devices each responsive to a different one of said parameters and being operable to assume a state corresponding to the polarity of the respective parameter applied thereto, and
- a coincidence circuit means coupled between said switching devices and said reversible pulse counter to cause said counter to count in one direction when said switching devices are in the same state and in the opposite direction when said switching devices are in different states.

24. Apparatus for measuring electrical active energy in a multi-phase network, said energy produced by the parameters of current and voltage associated with each of said phases, comprising,
- a first pulse converter associated with each of said phases for producing a first train of pulses having the characteristic that the product of pulse frequency and pulse width is proportional to the respective voltage of each of said phases;
- a second pulse converter associated with each of said phases for producing a second train of pulses having the characteristic that the product of pulse frequency and pulse width is proportional to the respective current of each of said phases;
- circuit means for providing a separate train of scanning pulses for each of said phases, comprising,
    - a pulse generator for producing one of said separate trains of scanning pulses, and
    - delay line means coupled to said pulse generator for producing the others of said separate trains of scanning pulses delayed in time; and
- a coincidence circuit associated with each of said phases and operably connected to said first and second pulse converters and said circuit means for providing scanning pulses to produce output pulses upon coincidence to thereby provide a train of output pulses for each of said phases having average frequency proportional to power; and
- a reversible pulse counter operably connected to each of said coincidence circuits to count said output pulses; and
- switching circuit means for controlling the direction of counting of said reversible counter so that,
    - said counter counts in one direction when the product of said parameters is positive and,
    - said counter counts in a different direction when the product of said parameters is negative.

25. Apparatus according to claim 24 wherein said switching circuit means includes
- a pair of switching devices each responsive to a different one of said parameters and being operable to assume a state corresponding to the polarity of the respective parameter applied thereto, and
- a coincidence circuit means coupled between said switching devices and said reversible pulse counter to cause said counter to count in one direction when said switching devices are in the same state and in the opposite direction when said switching devices are in different states.

26. In a system for measuring the electrical energy of a multi-phase network, the combination of
- a statistical pulse comparison means for each of said phases providing a pulse train having an average frequency proportional to the power of the respective phase;
- means so interconnecting said statistical pulse comparison means that individual pulses in said pulse trains associated with each of said phases are non coincident; and
- counter means connected to each of said pulse comparison means and operative to count pulses in said pulse trains to derive a measure of the electrical energy of the multi-phase system.

References Cited

UNITED STATES PATENTS 3,067,941   12/1962   Marlot _____ 235—194

FOREIGN PATENTS 1,061,177   4/1954   France.

ALFRED E. SMITH, Primary Examiner

U.S. Cl. X.R.

235—194